Patented Nov. 1, 1938

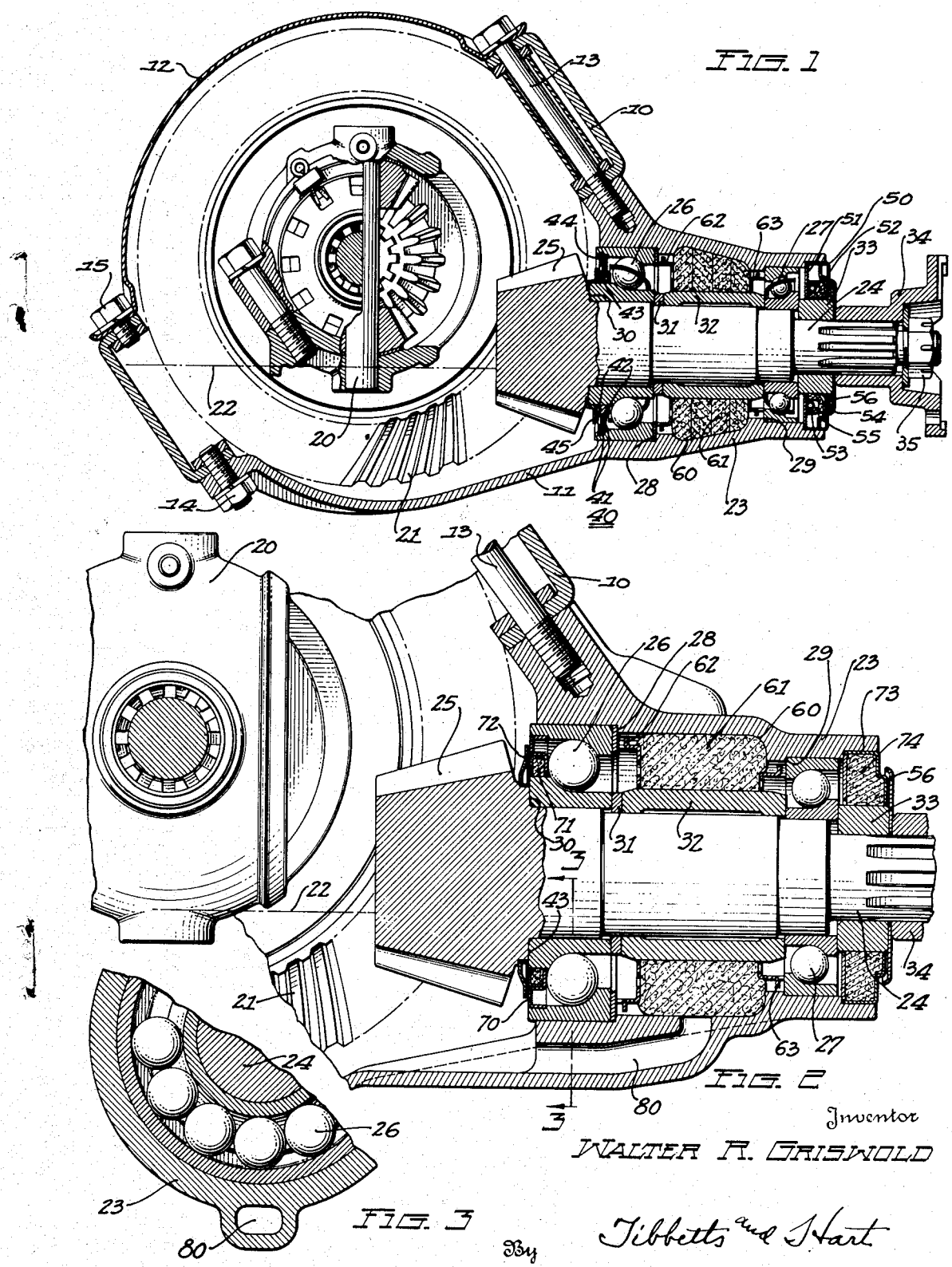

2,135,477

UNITED STATES PATENT OFFICE 2,135,477

MOTOR VEHICLE

Walter R. Griswold, Detroit, Mich., assignor to Packard Motor Car Company, Detroit, Mich., a corporation of Michigan Application April 13, 1935, Serial No. 16,147

6 Claims. (Cl. 184—6)

This invention relates to motor vehicles and particularly to means for supporting and lubricating a driving shaft thereof.

The invention is shown in connection with a motor vehicle axle and is particularly applied to the drive shaft which enters the axle and drives the gears therein.

When hypoid gears such as those shown in the drawings are used in the transmission line of a vehicle it is found desirable to use special lubricants and the most usual lubricant is one having lead soap and sulphur added to the usual petroleum base, and some of these substances, particularly the lead soap, are undesirable in the lubricant for the heavily loaded high speed bearings of the driving shaft. A problem has developed therefor of supplying one type of lubricant to the hypoid gears and another type of lubricant to the bearings of the drive shaft, and it is one of the objects of the present invention to solve this problem and insure the bearings being supplied with desirable lubricant and if some of it is obtained from the axle casing, to insure that the lead soap is removed therefrom before it reaches these high speed bearings.

Other objects of the invention will appear from the following description taken in connection with the drawing, which forms a part of this specification, and in which:

Fig. 1 is a sectional view through an axle or gear casing embodying the invention;

Fig. 2 is an enlarged view of a portion of a casing similar to that of Fig. 1, embodying a slightly modified form of the invention, and Fig. 3 is a section on the line 3—3 of Fig. 2.

The invention is shown as applied to the driving axle of a motor vehicle in which 10 represents the axle supporting part, 11 a casting forming a portion of the casing and supporting the driving shaft, and 12 a stamping forming a cover for the opposite side of the casing. Bolts 13, 14 and 15 secure the parts together. Mounted in the casing is a differential gearing 20 upon which is the ring gear 21 for driving the differential mechanism and axle sections. These parts are rotatably supported in the casing but the bearings therefor are not shown. The gear 21 dips into the lubricant in the casing, the approximate normal level of which is indicated at 22.

The casing part 11 is formed with a boss 23 through which there is an opening extending from the interior of the casing, and in this boss and extending through this opening is a driving shaft 24 having a pinion 25 thereon meshing with the ring gear 21. The shaft 24 is mounted below the axis of the driven gear and the gears are formed with curved teeth as shown. In other words, these gears are of the so-called "hypoid" type for quiet action and longer wear.

The shaft 24 is mounted in the casing in two separated ball bearings, an inner bearing 26 and a smaller outer bearing 27. The outer race of bearing 26 rests against a shoulder 28 in the casing and the outer race of bearing 27 rests against an opposite shoulder 29 in the casing. The inner race of bearing 26 rests against a shoulder 30 on the shaft 24 and there are spacers 31 and 32 on the shaft 24 between the inner races of the bearings 26 and 27. The small spacer 31 is used so that a selection may be made from several different sizes to obtain just the right space between the bearings so that the bearing may be preloaded as will be later described.

A sleeve 33 surrounds the shaft 24 in contact with the inner race of the bearing 27 and a universal joint part 34 is keyed or splined at the end of the shaft. A nut 35 is threaded on the end of the shaft and when tightened will clamp the parts together on the shaft against the shoulder 30. Thus by the selection of the correct spacer 31 the bearings 26 and 27 may be preloaded to any desired extent. Usually there is a two thousandths clearance provided, or thereabouts, and this is taken up by the clamping action of the nut 35 to give the bearing the desired preload.

Since, as above stated, it is desirable to provide the hypoid gears with a special lubricant usually containing lead soap and it is undesirable to have this material get into the bearings 26 and 27, provision is made for filtering any oil that may pass from the main lubricant containing space of the casing to the bearings. Thus a filtering element 40 is provided between the inner ends of the races of bearing 26. As shown, this filter element comprises two stampings 41 having openings 42 therein and spaced to provide a housing for filter material such as felt 43. The filter element is retained in position in the outer race of bearing 26 by means of a split snap ring 44 which is snapped into a groove in the outer race. To prevent too much of the lubricant reaching the filter element 40 a throw-off ring 45 is preferably mounted on the shaft 24 just inside of the filter element.

Adjacent the outer end of the shaft 24 and beyond the bearing 27 there is provided a suitable packing. As shown, this packing is in the form of a pressed steel cup 50 which is pressed into the opening in the casing with some adhesive material so that it may be retained in place, and a stamping 51 to complete the housing and a rawhide washer 52, the turned over end of which is surrounded by a coil spring 53 to press it against the periphery of the sleeve 33 on the shaft 24. A second rawhide washer 54 may also be used, with a separating stamping 55 between the washers. A throw-off ring 56 is secured to the shaft 24 between the universal joint part 34 and the sleeve 33, to better protect the packing.

From the above description it will be seen that the bearings 26 and 27 for the shaft 24 are protected from outside foreign substances and from the harmful substances in the lubricant in the main compartment in the casing and while some lubricant may pass through the filter element 40 to the bearings a further provision is made for the lubrication of these bearings in that between the bearings the casing, or the boss 23, forms a compartment 60 of relatively large capacity and this compartment is filled with lubricant retaining material such as felt 61. Perforated stampings 62 and 63 retain the felt in position slightly spaced from the bearings 26 and 27 but in open communication therewith. When the felt is assembled in the casing it is saturated with a light oil suitable for lubricating the bearings 26 and 27 and this oil is depended upon as the principal source of supply for these bearings though the oil which may pass through the filter 40 may also supply bearing 26. The large capacity of the compartment 60 makes frequent additions of bearing lubricant unnecessary.

In the form of the invention shown in Figs. 2 and 3 the main parts of the gearing and casing are the same and are lettered the same. In this form, however, a packing gland 70 is shown between the races of the bearing 26 instead of the filter 40, though the packing material 71 may be made of felt so that it would, therefore, act as a filter to any lubricant that passed through the packing. A somewhat similar throw-off ring 72 is provided just inside the packing 70. A packing ring 73 of slightly different form is shown at the outer end of the shaft and the packing material 74 in this instance may also be felt instead of the rawhide shown in Fig. 1.

In this modified form of the invention in order to insure permanent saturation of the lubricant retaining material 61 a channel 80 is formed between the main lubricant containing space of the casing and the compartment 60. Preferably this channel 80 is at the lowest point of the casing so that it constantly supplies lubricant to the felt 61 and, of course, this felt acts as a filter for this lubricant so that the lead soap cannot reach the bearings 26 and 27 and yet these bearings are always supplied with lubricant from this source.

It will be understood that various forms of the invention other than those described above may be used without departing from the spirit or scope of the invention.

Having thus described my invention, what I claim and desire to secure by Letters Patent is:

1. In a motor vehicle, the combination with a gear casing having an opening therein, of a gear shaft extending through said opening, two separated bearings in said casing for supporting said shaft, said casing forming a main lubricating space and forming a compartment between said bearings separated from said space by one of said bearings, packing between the casing and shaft on the side of each bearing away from said compartment, lubricant retaining material such as felt substantially filling said compartment and in open communication with said bearings, and means comprising a conduit placing said space in communication with said compartment but through said felt only.

2. In a motor vehicle, the combination with an axle casing forming a space for gears and for lubricant and having an opening therein the lower part of which is below the normal level of the lubricant, and a driven gear mounted in said axle to dip into the lubricant, of a drive shaft extending through said opening and having a driving connection at its outer end and having a pinion at its inner end meshing with said driven gear, two separated bearings surrounding said shaft between said driving connection and said pinion and supporting said shaft in said casing, a filter packing around the shaft inside the inner bearing, said casing forming a compartment between said bearings with one of said bearings between said compartment and the lubricant space of said casing, and lubricant retaining material substantially filling said compartment and in open communication with said bearings.

3. In a motor vehicle, the combination of an axle casing and a drive shaft extending into the casing, of means for supporting the shaft in the casing comprising separated ball bearings so mounted that the bearings are preloaded when assembled, means for isolating said bearings from the main lubricant containing space of said casing comprising filter packing between the inner end of said bearings and the interior of said casing, and lubricant supply means for said bearings comprising oil saturated filter means substantially filling the space between said bearings.

4. In a motor vehicle, the combination of an axle casing having an opening therein the lower part of which is below the normal level of lubricant carried by the casing, of a drive shaft extending through said opening into the casing, separated ball bearings in the casing supporting said shaft, said casing forming a compartment between the bearings separate from the main lubricant containing space of said casing, a filter packing around the shaft inside the inner bearing filter material substantially filling said compartment, and means comprising a channel between the main lubricant containing space of said casing and said compartment whereby lubricant may reach said bearings in filtered condition by passing through said passage and said filter material.

5. In a motor vehicle, the combination with a casing having a compartment for gears, and having an adjacent compartment for bearings for a shaft, said casing having an opening into said bearing compartment, of a shaft extending through said opening and through said bearing compartment and having a gear thereon in the gear compartment, mounting means for said shaft in said casing comprising two separated bearings in the bearing compartment, oil-saturated filter material substantially filling the space between said bearings in said bearing compartment, and filter packing between the shaft and casing inside of the inner of said two bearings, said filter packing thereby isolating the bearing compartment from the gearing compartment except for lubricant that may pass through said filter.

6. In a motor vehicle, the combination with an axle casing forming a space for gears and for lubricant and having an opening therein the lower part of which is below the normal level of the lubricant, and a driven gear mounted in said axle to dip into the lubricant, of a drive shaft extending through said opening and having a driving connection at its outer end and having a pinion at its inner end meshing with said driven gear, two separated bearings surrounding said shaft between said driving connection and said pinion and supporting said shaft in said casing, means for isolating said bearings from the main lubricant-containing space of said casing comprising filter packing between the inner of said bearings and the interior of said casing, said casing forming a compartment between said bearings, and lubricant-retaining material substantially filling said compartment and in open communication with said bearings.

WALTER R. GRISWOLD.